(12) United States Patent
Demura

(10) Patent No.: US 12,073,991 B2
(45) Date of Patent: Aug. 27, 2024

(54) SUPERCONDUCTING COIL DEVICE AND ELECTRIC CURRENT INTRODUCTION LINE

(71) Applicant: SUMITOMO HEAVY INDUSTRIES, LTD., Tokyo (JP)

(72) Inventor: Kenta Demura, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 100 days.

(21) Appl. No.: 17/862,307

(22) Filed: Jul. 11, 2022

(65) Prior Publication Data

US 2023/0020572 A1   Jan. 19, 2023

(30) Foreign Application Priority Data

Jul. 14, 2021   (JP) ................................. 2021-116492

(51) Int. Cl.
*H01F 6/06* (2006.01)
*H01F 6/00* (2006.01)
*H01F 6/04* (2006.01)

(52) U.S. Cl.
CPC .............. *H01F 6/06* (2013.01); *H01F 6/008* (2013.01); *H01F 6/04* (2013.01)

(58) Field of Classification Search
CPC ... H01F 6/06; H01F 6/008; H01F 6/04; H01F 6/065; H01F 6/006; Y02E 40/60; Y10S 336/01

USPC ........................................................... 335/19
See application file for complete search history.

(56) References Cited

U.S. PATENT DOCUMENTS

| 5,947,711 | A   | * | 9/1999 | Myers | .................. | F01C 21/007 |
| | | | | | | 418/101 |
| 9,293,253 | B2  | * | 3/2016 | Calvert | ...................... | H01F 6/04 |
| 2012/0094840 | A1 | * | 4/2012 | Tanaka | ...................... | H01F 6/04 |
| | | | | | | 505/211 |

FOREIGN PATENT DOCUMENTS

| JP | 2008251564 A | * | 10/2008 |
| JP | 2008251564 A | | 10/2008 |

\* cited by examiner

*Primary Examiner* — Shawki S Ismail
*Assistant Examiner* — Lisa N Homza
(74) *Attorney, Agent, or Firm* — HEA LAW PLLC

(57) ABSTRACT

A superconducting coil device includes a vacuum vessel, a superconducting coil located inside the vacuum vessel, a heat shield surrounding the superconducting coil within the vacuum vessel, and an electric current introduction line for introducing an electric current into the superconducting coil. The electric current introduction line includes an outer current lead part located outside of the heat shield, within the vacuum vessel, and thermally coupled to the heat shield, and an inner current lead part located inside of the heat shield and connecting the outer current lead part to the superconducting coil. The outer current lead part includes a main body serving as an electric current path to the superconducting coil, an insulation layer that covers the main body, and a heat shield layer that covers the insulation layer and has a lower emissivity than the insulation layer.

10 Claims, 3 Drawing Sheets

SUPERCONDUCTING COIL DEVICE AND ELECTRIC CURRENT INTRODUCTION LINE

RELATED APPLICATIONS

The content of Japanese Patent Application No. 2021-116492, on the basis of which priority benefits are claimed in an accompanying application data sheet, is in its entirety incorporated herein by reference.

BACKGROUND

Technical Field

Certain embodiments of the present invention relate to a superconducting coil device and an electric current introduction line to the superconducting coil device.

Description of Related Art

A superconducting coil is disposed in a vacuum vessel and is connected to an external power source device by an electric current introduction line. The superconducting coil can be cooled to a cryogenic temperature in the vacuum vessel in order to bring it into a superconducting state, and receive electric power that is fed from the external power source device through the electric current introduction line to generate a high magnetic field.

SUMMARY

According to an embodiment of the present invention, there is provided a superconducting coil device including: a vacuum vessel; a superconducting coil located inside the vacuum vessel; a heat shield surrounding the superconducting coil within the vacuum vessel; and an electric current introduction line for introducing an electric current into the superconducting coil. The electric current introduction line including an outer current lead part that is located outside of the heat shield, within the vacuum vessel, and that is thermally coupled to the heat shield, and an inner current lead part that is located inside of the heat shield and connects the outer current lead part to the superconducting coil. The outer current lead part includes a main body serving as an electric current path to the superconducting coil, an insulation layer that covers the main body, and a heat shield layer that covers the insulation layer and has a lower emissivity than the insulation layer.

According to another embodiment of the present invention, there is provided an electric current introduction line for introducing an electric current into a superconducting coil that is disposed in a vacuum vessel. The electric current introduction line includes an outer current lead part located inside the vacuum vessel and outside a heat shield disposed to surround the superconducting coil within the vacuum vessel, and that is thermally coupled to the heat shield. The outer current lead part includes a main body serving as an electric current path to the superconducting coil, an insulation layer that covers the main body, and a heat shield layer that covers the insulation layer and that has a lower emissivity than the insulation layer.

DETAILED DESCRIPTION

Figure 1:
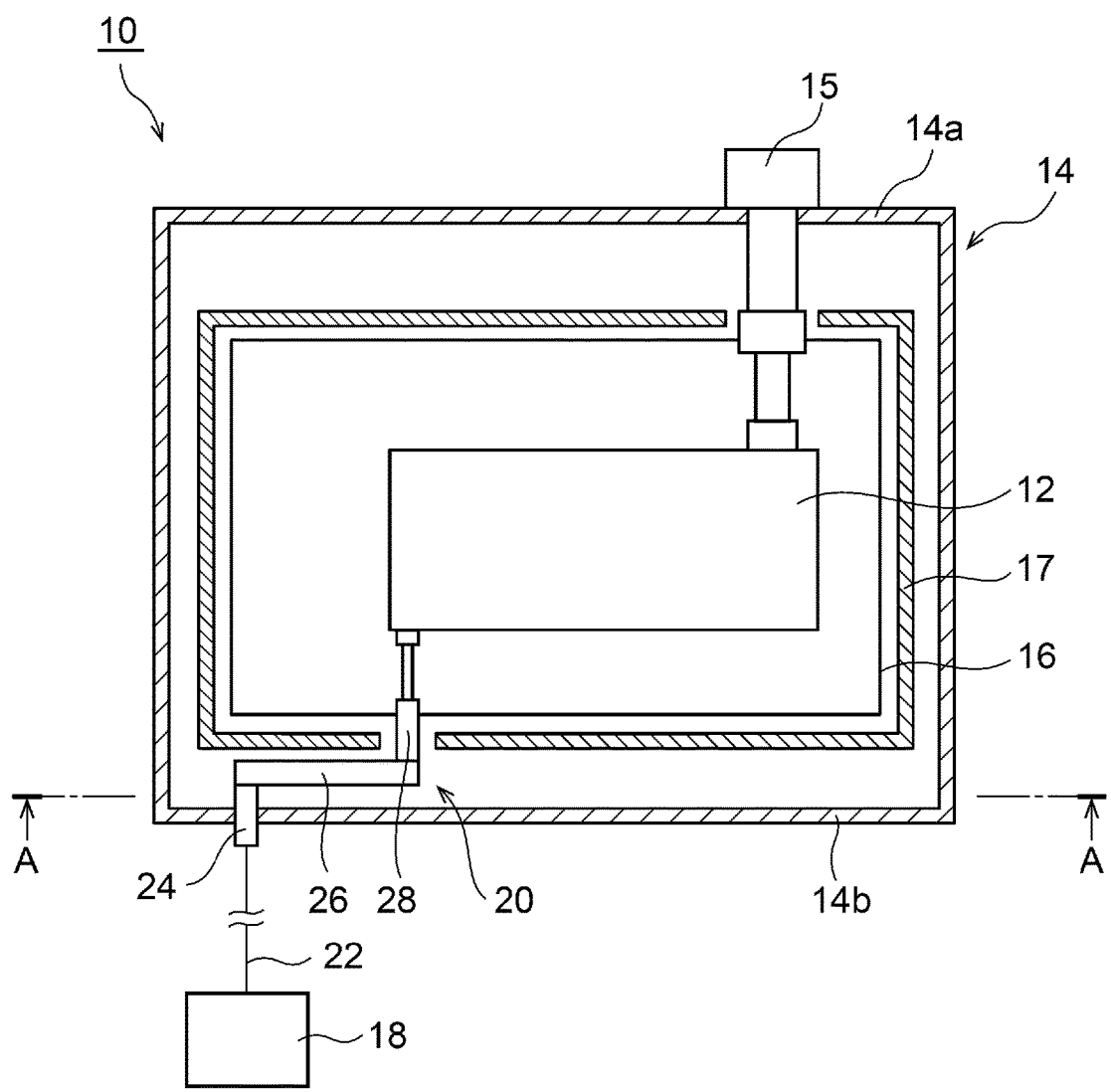
FIG. 1 is a side view schematically showing a superconducting coil device according to an embodiment.

It is known in a related art that an electric current introduction line brings input heat to a superconducting coil due to the following two factors. One of the factors is Joule heat that is generated when an electric current flows through the electric current introduction line. The other factor is input heat from the outside to the superconducting coil due to heat conduction using the electric current introduction line as a heat transfer path, which occurs because one end of the electric current introduction line is drawn out of a vacuum vessel and is at ambient temperature (for example, room temperature) and the other end is cooled to a cryogenic temperature together with the superconducting coil.

The inventor of the present invention has noticed that in addition to these two factors, there is a third input heat factor. It is radiant heat. A portion of the electric current introduction line may be disposed in the vicinity of a vacuum vessel wall within the vacuum vessel. Therefore, the radiant heat that is generated by the vacuum vessel wall may be incident on the portion of the electric current introduction line and may be transferred to the superconducting coil through the electric current introduction line. In order to reliably maintain the superconducting coil in a superconducting state, it is desirable to suppress input heat to the electric current introduction line as much as possible.

It is desirable to suppress radiant input heat to an electric current introduction line of a superconducting coil.

Any combinations of the above components or replacements of components or expressions of the present invention between methods, devices, systems, or the like are also effective as aspects of the present invention.

Hereinafter, an embodiment for carrying out the present invention will be described in detail with reference to the drawings. In the description and drawings, identical or equivalent components, members, and processes are denoted by the same reference numerals, and overlapping description is omitted as appropriate. The scale or shape of each of the illustrated parts is conveniently set for ease of description and is not to be interpreted as limiting unless otherwise specified. The embodiment is exemplary and does not limit the scope of the present invention in any way. All features described in the embodiment or combinations thereof are not essential to the invention.

FIG. 1 is a side view schematically showing a superconducting coil device 10 according to an embodiment. The superconducting coil device 10 is mounted to high magnetic field utilization equipment as a magnetic field source for, for example, a single crystal pulling device, an NMR system, an MRI system, an accelerator such as a cyclotron, a high-energy physical system such as a nuclear fusion system, or other high magnetic field utilization equipment (not shown), and can generate a high magnetic field that is required for the equipment.

The superconducting coil device 10 includes a superconducting coil 12, a vacuum vessel 14, a heat shield 16, and an electric current introduction line 20. The superconducting coil 12 is connected to an external power source 18 disposed outside the vacuum vessel 14 via the electric current introduction line 20. An excitation current is supplied from the external power source 18 to the superconducting coil 12 through the electric current introduction line 20. In this way, the superconducting coil device 10 can generate a strong magnetic field.

The superconducting coil 12 is disposed in the vacuum vessel 14. The superconducting coil 12 is thermally coupled to, for example, a two-stage Gifford-McMahon (GM) cryocooler or other type of cryocooler 15 installed to the vacuum vessel 14, and is used in a state of being cooled to a cryogenic temperature equal to or lower than a superconducting transition temperature. In this embodiment, the superconducting coil device 10 is configured as a so-called conduction cooling type in which the superconducting coil 12 is directly cooled by the cryocooler 15, instead of as an immersion cooling type in which the superconducting coil 12 is immersed in a cryogenic liquid refrigerant such as liquid helium. The superconducting coil device 10 may be an immersion cooling type.

The vacuum vessel 14 is an adiabatic vacuum vessel that provides a cryogenic vacuum environment suitable for bringing the superconducting coil 12 into a superconducting state, and is also called a cryostat. Typically, the vacuum vessel 14 has a columnar shape or a cylindrical shape having a hollow portion at a central portion. Therefore, the vacuum vessel 14 has a substantially flat circular or annular top plate 14a and bottom plate 14b, and a cylindrical side wall (a cylindrical outer peripheral wall, or coaxially disposed cylindrical outer peripheral wall and inner peripheral wall) connecting the top plate 14a and the bottom plate 14b. The cryocooler 15 may be installed on the top plate 14a of the vacuum vessel 14. The vacuum vessel 14 is formed of, for example, a metal material such as stainless steel or other suitable high strength material to withstand ambient pressure (for example, atmospheric pressure).

The heat shield 16 is disposed so as to surround the superconducting coil 12 within the vacuum vessel 14. The heat shield 16 is formed of, for example, a metal material such as copper or other material having high thermal conductivity. The heat shield 16 may be cooled by a first-stage cooling stage of the two-stage cryocooler 15 that cools the superconducting coil 12, or by a single-stage cryocooler different from the two-stage cryocooler. During the operation of the superconducting coil device 10, the heat shield 16 is cooled to a first cooling temperature, for example, a temperature in a range of 30 K to 50 K, and the superconducting coil 12 is cooled to a second cooling temperature, for example, a temperature in a range of 3 K to 20 K, which is lower than the first cooling temperature. The heat shield 16 can thermally protect a low-temperature section such as the superconducting coil 12, which is disposed inside the heat shield 16 and is cooled to a lower temperature than the heat shield 16, from radiant heat from the vacuum vessel 14.

The electric current introduction line 20 for introducing an electric current into the superconducting coil 12 includes an external wire 22, a feedthrough part 24, an outer current lead part 26, and an inner current lead part 28, and forms an electric current path from the external power source 18 to the superconducting coil 12. For simplicity, in FIG. 1, only one electric current introduction line 20 is shown. However, in general, a plurality of electric current introduction lines 20 may be provided in the superconducting coil device 10, and, for example, one electric current introduction line 20 on a positive electrode side and one electric current introduction line 20 on a negative electrode side may be provided.

The external wire 22 disposed outside the vacuum vessel 14 connects the external power source 18 to the feedthrough part 24 provided in a wall portion of the vacuum vessel 14. The external wire 22 may be an appropriate power supply cable. The feedthrough part 24 is an airtight terminal for introducing an electric current into the vacuum vessel 14, and connects the external wire 22 to an internal wire (that is, the outer current lead part 26 and the inner current lead part 28) in the vacuum vessel 14. The electric current introduction line 20 can penetrate the wall portion of the vacuum vessel 14 while maintaining the airtightness of the vacuum vessel 14 by means of the feedthrough part 24.

In this embodiment, as shown in the drawings, the feedthrough part 24 is installed to the bottom plate 14b of the vacuum vessel 14, and the electric current introduction line 20 is disposed at an outer peripheral portion on a lower side of the vacuum vessel 14. This disposition is advantageous from the viewpoint of workability. Depending on the field of application of the superconducting coil device 10, the vacuum vessel 14 is often considerably large (for example, having a diameter of several meters or more) compared to a worker. If the feedthrough part 24 is provided at the outer peripheral portion of the vacuum vessel 14, the worker can easily access the electric current introduction line 20 from the periphery of the superconducting coil device 10. The feedthrough part 24 may be installed on an upper surface of the vacuum vessel 14, and the electric current introduction line 20 may be disposed at an outer peripheral portion on an upper side of the vacuum vessel 14. Alternatively, the feedthrough part 24 and the electric current introduction line 20 may be provided at other locations of the vacuum vessel 14.

The outer current lead part 26 is disposed outside the heat shield 16 within the vacuum vessel 14 and connects the feedthrough part 24 to the inner current lead part 28. A heat insulating layer 17 may be provided between the vacuum vessel 14 and the heat shield 16 in order to protect the heat shield 16 from the radiant heat that is emitted from the vacuum vessel 14. The heat insulating layer 17 may be, for example, multilayer insulation (MLI) or may be disposed so as to surround the heat shield 16. The outer current lead part 26 may be disposed outside the heat insulating layer 17.

As will be described later, the outer current lead part 26 includes a first end portion, a second end portion, and a connecting portion that connects both end portions, and is fixed to the feedthrough part 24 at the first end portion and to the inner current lead part 28 at the second end portion. An appropriate joining method such as bolt fastening or solder fastening can be used for the fixation of the outer current lead part 26 to the feedthrough part 24 (and the inner current lead part 28).

Further, the outer current lead part 26 is thermally coupled to the heat shield 16. The second end portion of the outer current lead part 26 is fixed to the heat shield 16 or is connected to the heat shield 16 through an appropriate heat transfer member to be cooled to the first cooling temperature, similar to the heat shield 16. However, the outer current lead part 26 is in a state of being electrically insulated from the heat shield 16.

In this embodiment, the outer current lead part 26 extends along the wall portion (for example, the bottom plate 14b) of the vacuum vessel 14. As shown in the drawings, in a case where the vacuum vessel 14 is disposed with the top plate 14a facing upward and the bottom plate 14b facing downward, the outer current lead part 26 extends in a traverse direction (a horizontal direction) within the vacuum vessel 14. Depending on the disposition of the internal equipment such as the superconducting coil 12 and the heat shield 16 within the vacuum vessel 14, the outer current lead part 26 may extend in another direction, for example, in a lengthwise direction (a vertical direction) within the vacuum vessel 14.

The outer current lead part 26 may be a thin plate having a belt-like or rectangular shape, as an example. In this case, the dimension (length) in a longitudinal direction of the outer current lead part 26 is larger than the dimension (width) in a lateral direction, and the dimension in the lateral direction is larger than the thickness of the outer current lead part 26. In the illustrated example, the longitudinal direction of the outer current lead part 26 corresponds to a first direction (a left-right direction in FIG. 1) in a horizontal plane, and a thickness direction of the outer current lead part 26 corresponds to a second direction (a depth direction in the paper surface of FIG. 1) perpendicular to the first direction in the horizontal plane. The lateral direction of the outer current lead part 26 corresponds to a vertical direction (an up-down direction in FIG. 1) perpendicular to the horizontal plane.

The outer current lead part 26 may have other shapes. For example, the outer current lead part 26 may be formed, for example, as a bundle of a large number of thin wires or a large number of foils so as to have flexibility. Further, the outer current lead part 26 may have, for example, a rod-like shape such as a columnar shape, instead of the thin plate-like shape.

The inner current lead part 28 is disposed inside the heat shield 16 and connects the outer current lead part 26 to the superconducting coil 12. The inner current lead part 28 may extend in a direction different from that of the outer current lead part 26 within the vacuum vessel 14. In the illustrated example, the inner current lead part 28 extends in the lengthwise direction (the vertical direction) from the second end portion of the outer current lead part 26 to the superconducting coil 12. Alternatively, the inner current lead part 28 may extend in the same direction as the outer current lead part 26. The inner current lead part 28 may include terminal portions at both ends, which are respectively connected to the outer current lead part 26 and the superconducting coil 12, and a superconducting current lead that connects the terminal portions. The superconducting current lead may have, for example, a rod-like shape such as a columnar shape, or may be formed of a copper oxide superconductor or other high-temperature superconducting material. Alternatively, the superconducting current lead may be formed of a low-temperature superconducting material typified by NbTi.

Figure 2:
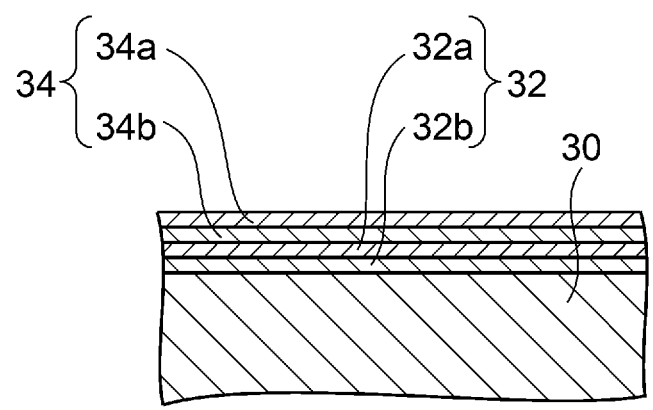
FIG. 2 is a diagram schematically showing a cross section of a laminated structure of an outer current lead part of an electric current introduction line according to the embodiment.

FIG. 2 is a diagram schematically showing a cross section of a laminated structure of the outer current lead part 26 of the electric current introduction line 20 according to the embodiment. As shown in the drawing, the outer current lead part 26 includes a main body 30, an insulation layer 32a, and a heat shield layer 34a. In a case where the outer current lead part 26 has a thin plate shape as described above, the insulation layer 32a and the heat shield layer 34a are laminated on the main body 30 in the thickness direction of the outer current lead part 26.

The main body 30 of the outer current lead part 26 is formed of a conductive material, for example, a metal material having excellent conductivity and represented by pure copper such as oxygen-free copper, and serves as an electric current path to the superconducting coil 12.

The insulation layer 32a covers the main body 30. The insulation layer 32a may be formed of, for example, a synthetic resin material having insulation properties, such as a polyimide film called Kapton (registered trademark), or another insulating material. The outer current lead part 26 may include an insulation tape 32 having one surface as the insulation layer 32a and the other surface as an adhesion layer 32b to the main body 30. Consequently, the insulation layer 32a can be easily provided on the main body 30 by attaching the insulation tape 32 to the main body 30. Alternatively, the insulation layer 32a may be formed on the main body 30 by attaching an insulating material to the surface of the main body 30 via application or the like.

The heat shield layer 34a covers the insulation layer 32a. The heat shield layer 34a is provided as the outermost layer of the outer current lead part 26, and is exposed to the vacuum environment in the vacuum vessel 14. The heat shield layer 34a is formed of a material having an emissivity lower than that of the insulation layer 32a. It is sufficient if the emissivity of the heat shield layer 34a is lower than the emissivity of the insulation layer 32a at a reference wavelength (for example, a predetermined infrared wavelength such as 1 μm). The heat shield layer 34a has a surface having a metallic luster in order to obtain a high emissivity, and may be formed of, for example, metal such as aluminum or copper. The emissivity of the insulating material forming the insulation layer 32a typically significantly exceeds 0.5, whereas the metal surface usually has an emissivity less than 0.1, such as about 0.02 in the case of an aluminum vapor deposition surface and about 0.06 on a polished surface of phosphorous-deoxidized copper.

The outer current lead part 26 may include a heat shield tape 34 having one surface as the heat shield layer 34a and the other surface as an adhesion layer 34b to the insulation layer 32a. Consequently, the heat shield layer 34a can be easily provided on the insulation layer 32a by attaching the heat shield tape 34 to the insulation layer 32a or the insulation tape 32. Alternatively, the heat shield layer 34a may be formed on the insulation layer 32a by attaching a metal material to the insulation layer 32a via plating or the like.

It is not essential that the insulation tape 32 is composed of two layers, the insulation layer 32a and the adhesion layer 32b, and at least one intermediate layer may be provided between the insulation layer 32a and the adhesion layer 32b. The insulation tape 32 may have at least one coating layer on the outside of the insulation layer 32a. The main body 30 may have some coating layer covering the surface thereof, and the coating layer may be covered with the insulation layer 32a, or the insulation tape 32 may be attached to the coating layer. Further, it is not essential that the heat shield tape 34 is composed of two layers, the heat shield layer 34a and the adhesion layer 34b, and at least one intermediate layer may be provided between the heat shield layer 34a and the adhesion layer 34b. As long as the emissivity of the heat shield layer 34a is not significantly affected, the heat shield layer 34a may be covered with at least one coating layer (for example, a protective layer formed of a transparent material), or the heat shield tape 34 may have at least one coating layer on the outside of the heat shield layer 34a.

Even in a case where the main body 30 of the outer current lead part 26 has another shape, similarly, the main body 30 may be covered with the insulation layer 32a and the heat shield layer 34a. For example, in a case where the main body 30 is formed as a bundle of a large number of thin wires or a large number of foils, each of the thin wires or the foils may be covered with the insulation layer 32a and the heat shield layer 34a. Even in a case where the main body 30 has a rod-like shape, it may be covered with the insulation layer 32a and the heat shield layer 34a.

Assuming that the heat shield layer 34a does not exist and the insulation layer 32a is exposed, the insulation layer 32a generally has a high emissivity, as described above, and therefore, there is a concern that the radiant input heat that is emitted from an inner wall surface of the vacuum vessel 14 and that is received by the outer current lead part 26 may increase accordingly.

In contrast, according to the embodiment, the outer current lead part 26 is covered with the heat shield layer 34a and has a low emissivity. Therefore, it becomes difficult for the outer current lead part 26 to absorb the radiant heat emitted from the inner wall surface of the vacuum vessel 14, and the radiant input heat to the outer current lead part 26 and eventually the input heat to the superconducting coil 12 through the electric current introduction line 20 can be suppressed.

In particular, in a case where the outer current lead part 26 is disposed near the vacuum vessel 14 such that the outer current lead part 26 is disposed outside the heat insulating layer 17 and extends along the wall surface of the vacuum vessel 14, the radiant heat from the vacuum vessel 14 easily reaches the outer current lead part 26. However, according to the embodiment, since the outer current lead part 26 is covered with the heat shield layer 34a, the inflow of the radiant heat can be effectively reduced.

Further, even if the heat shield layer 34a comes into contact with the heat insulating layer 17, since the insulation layer 32a is interposed between the heat shield layer 34a and the main body 30 of the outer current lead part 26, electrical leakage from the outer current lead part 26 can be avoided.

Figure 3:
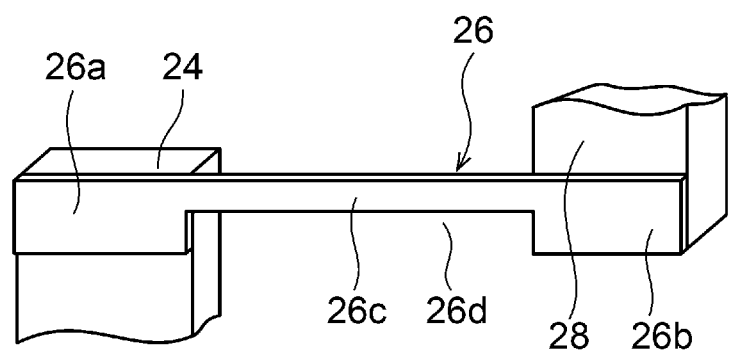
FIG. 3 is a perspective view schematically showing an exemplary outer current lead part.

FIG. 3 is a perspective view schematically showing the exemplary outer current lead part 26. The outer current lead part 26 has a first end portion 26a, a second end portion 26b, and a connecting portion 26c that connects the first end portion 26a and the second end portion 26b and that has a belt-like shape. As described above, the outer current lead part 26 is fixed to the feedthrough part 24 at the first end portion 26a and is fixed to the inner current lead part 28 at the second end portion 26b. Each of the terminal portions of the feedthrough part 24 and the inner current lead part 28, to which the first end portion 26a and the second end portion 26b are respectively fixed, is formed of a metal material having excellent conductivity, such as pure copper, similar to the outer current lead part 26. Each of the terminal portions is formed as a rectangular parallelepiped block having a contact surface matching the vertical and horizontal dimensions of each of the first end portion 26a and the second end portion 26b. For electrical contact, the surface of the main body 30 of the outer current lead part 26 comes into direct contact with and is fixed to the feedthrough part 24 and the inner current lead part 28 at the first end portion 26a and the second end portion 26b, respectively. The insulation layer 32a and the heat shield layer 34a as described above are not provided on the contact surface.

It is not essential that the connecting portion 26c is a simple elongated rectangle. As shown in FIG. 3, the connecting portion 26c may be thinner than the first end portion 26a and the second end portion 26b. That is, the width of the outer current lead part 26 in the lateral direction (in the drawing, the up-down direction) is smaller in the connecting portion 26c than in the first end portion 26a and the second end portion 26b.

By making the connecting portion 26c thin in this manner, the surface area of the outer current lead part 26 can be reduced, so that the radiant input heat can also be reduced. On the other hand, the first end portion 26a and the second end portion 26b can have a relatively large area, and thus the contact area between the first end portion 26a and the feedthrough part 24 and the contact area between the second end portion 26b and the inner current lead part 28 can be increased. In such a contact portion, heat may be generated due to energization. However, the influence of heat generation can be reduced by widening the contact area.

The connecting portion 26c connects the first end portion 26a and the second end portion 26b on the upper side in the lateral direction in the drawing. The outer current lead part 26 may be manufactured by cutting a region 26d below the connecting portion 26c in the drawing from an elongated rectangular thin plate. Consequently, the outer current lead part 26 can be manufactured at low cost.

Figure 4:
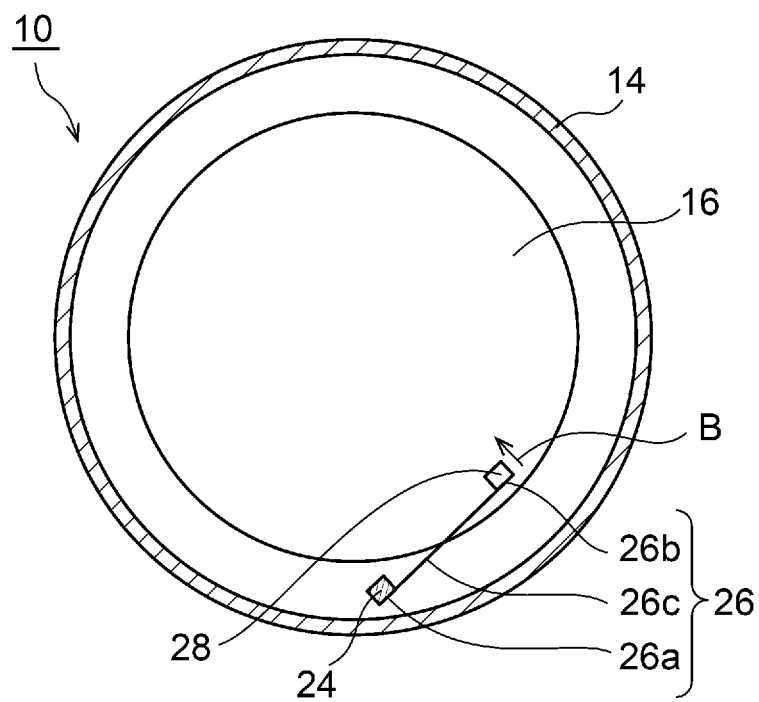
FIG. 4 is a diagram schematically showing a cross section taken along line A-A of the superconducting coil device shown in FIG. 1.

FIG. 4 is a diagram schematically showing a cross section taken along line A-A of the superconducting coil device 10 shown in FIG. 1. In FIG. 4, a state where the electric current introduction line 20 and the heat shield 16 are viewed from below in the vacuum vessel 14 is shown. In FIG. 4, the illustration of the heat insulating layer 17 is omitted.

As described above, the outer current lead part 26 has the first end portion 26a on the vacuum vessel 14 side, the second end portion 26b on the heat shield 16 side, and the connecting portion 26c connecting the first end portion 26a and the second end portion 26b and having a belt-like shape. The belt-like shape of the connecting portion 26c can be bent in the thickness direction. The outer current lead part 26 is disposed such that the second end portion 26b is displaced in the thickness direction with respect to the first end portion 26a due to thermal contraction caused by the cooling of the heat shield 16 and the connecting portion 26c is bent in the thickness direction.

More specifically, in a case where each of the vacuum vessel 14 and the heat shield 16 has a cylindrical shape as an example, the inner current lead part 28 is provided at the outer peripheral portion of the heat shield (for example, the outer peripheral portion of the lower surface of the heat shield, as described above), and the feedthrough part 24 is provided at the outer peripheral portion of the vacuum vessel 14 (for example, the outer peripheral portion of the lower surface of the vacuum vessel, as described above). The feedthrough part 24 and the inner current lead part 28 are disposed at positions deviated from each other in a circumferential direction of the vacuum vessel 14 such that the outer current lead part 26 extends substantially along a tangential direction to the cylindrical shape of the heat shield 16 (the longitudinal direction of the outer current lead part 26 substantially coincides with the tangential direction to the heat shield 16). The connecting portion 26c of the outer current lead part 26 is disposed such that the thickness direction faces in a radial direction of the vacuum vessel 14 and the heat shield 16, and the lateral direction faces in the up-down direction (in FIG. 4, the depth direction in the paper surface) of the vacuum vessel 14 and the heat shield 16.

The heat shield 16 thermally contracts in the radial direction toward the center due to cooling. Due to this thermal contraction, the inner current lead part 28 (and the second end portion 26b of the outer current lead part 26) is displaced in the radial direction with respect to the feedthrough part 24 (and the first end portion 26a of the outer current lead part 26) (indicated by arrow B in FIG. 4). This displacement in the radial direction is absorbed by elastic bending in the thickness direction of the connecting portion 26c of the outer current lead part 26. In this way, the occurrence of excessive thermal stress in other portions of the electric current introduction line 20 and the occurrence of excessive deformation or breakage of the electric current introduction line 20 due to the occurrence of excessive thermal stress can be avoided.

As another example of the disposition of the outer current lead part 26, the outer current lead part 26 may be disposed such that the thickness direction of the outer current lead part 26 coincides with the up-down direction of the vacuum vessel 14. Consequently, the outer current lead part 26 can absorb the thermal contraction in the up-down direction of the heat shield 16 via the bending of the connecting portion 26c.

Figure 5:
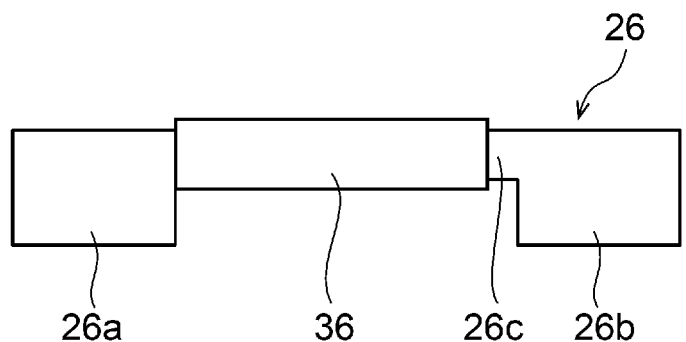
FIG. 5 is a diagram schematically showing another example of the outer current lead part.

FIG. 5 is a diagram schematically showing another example of the outer current lead part 26. The outer current lead part 26 may be provided with a tubular magnetic shield 36 surrounding the outer current lead part 26. The connecting portion 26c connecting the first end portion 26a and the second end portion 26b of the outer current lead part 26 is inserted into the magnetic shield 36. In the absence of the magnetic shield 36, the Lorentz force due to the high magnetic field that is generated by the superconducting coil 12 acts on the outer current lead part 26, and this can pose a risk of deformation or breakage in the outer current lead part 26. For example, in a case where an electric current flows through the connecting portion 26c from the first end portion 26a to the second end portion 26b in the left-right direction in FIG. 5 and the magnetic field that is generated by the superconducting coil 12 faces in the up-down direction in FIG. 5, the Lorentz force acts on the outer current lead part 26 so as to bend the outer current lead part 26 in the thickness direction. By providing the outer current lead part 26 with the magnetic shield 36, the Lorentz force can be suppressed, and the risk of deformation or breakage of the outer current lead part 26 can be reduced.

The surfaces (outer surface and inner surface) of the magnetic shield 36 may be made to be surfaces having a low emissivity by performing, for example, plating of metal such as aluminum and polishing (for example, electrolytic polishing). Consequently, it is possible to suppress the radiant input heat from the vacuum vessel 14 to the magnetic shield 36 and the radiant input heat from the magnetic shield 36 to the outer current lead part 26.

The magnetic shield 36 is formed of a magnetic material such as iron, for example. Since there is a case where such a material exhibits low-temperature brittleness, it is preferable to avoid cooling. Therefore, the magnetic shield 36 may be mounted on the first end portion 26a side instead of the second end portion 26b to be cooled. The magnetic shield 36 may be mounted to the feedthrough part 24 to which the first end portion 26a is fixed.

The present invention has been described above based on the example. It will be understood by those skilled in the art that the present invention is not limited to the above embodiment, various design changes are possible, various modification examples are possible, and such modification examples are also within the scope of the present invention. Various features described in relation to an embodiment are also applicable to other embodiments. New embodiments resulting from combinations exhibit the effects of each of the combined embodiments.

In the embodiment described above, the main body 30 of the outer current lead part 26, which serves as an electric current path to the superconducting coil 12, is made of only metal such as copper. However, in an embodiment, the main body 30 may have other configurations. For example, the main body 30 may be another wire rod such as a high-temperature superconducting wire rod, for example. The main body 30 made in this manner may be covered with the insulation layer 32a and the heat shield layer 34a.

Similarly, when required, in the surface of the terminal portion of the feedthrough part 24, to which the first end portion 26a of the outer current lead part 26 is to be attached, the surface that is exposed to the vacuum environment in the vacuum vessel 14, with which the first end portion 26a does not come into contact, may also be covered with the insulation layer 32a and the heat shield layer 34a. Further, in the surface of the terminal portion of the inner current lead part 28, to which the second end portion 26b of the outer current lead part 26 is to be attached, the surface that is exposed to the vacuum environment in the vacuum vessel 14, with which the second end portion 26b does not come into contact, may also be covered with the insulation layer 32a and the heat shield layer 34a.

The present invention has been described using specific terms and phrases, based on the embodiment. However, the embodiment shows only one aspect of the principle and application of the present invention, and in the embodiment, many modification examples or changes of disposition are permitted within the scope which does not depart from the idea of the present invention defined in the claims.

It should be understood that the invention is not limited to the above-described embodiment, but may be modified into various forms on the basis of the spirit of the invention. Additionally, the modifications are included in the scope of the invention.

What is claimed is:

1. A superconducting coil device comprising:
   a vacuum vessel;
   a superconducting coil located inside the vacuum vessel;
   a heat shield surrounding the superconducting coil within the vacuum vessel; and
   an electric current introduction line configured to introduce an electric current into the superconducting coil, the electric current introduction line comprising:
      an outer current lead part that is located outside of the heat shield, within the vacuum vessel, and that is thermally coupled to the heat shield, and
      an inner current lead part that is located inside of the heat shield and connects the outer current lead part to the superconducting coil,
   wherein the outer current lead part comprises:
      a main body serving as an electric current path to the superconducting coil and formed of a metal material,
      an insulation layer that covers the main body and formed of a synthetic resin material, and
      a heat shield layer that covers the insulation layer and has a lower emissivity than the insulation layer.

2. The superconducting coil device according to claim 1, wherein the outer current lead part comprises an insulation tape having one surface as the insulation layer and an opposite surface as an adhesion layer to the main body.

3. The superconducting coil device according to claim 1, wherein the outer current lead part comprises a heat shield tape having one surface as the heat shield layer and an opposite surface as an adhesion layer to the insulation layer.

4. The superconducting coil device according to claim 1, further comprising:
   a tubular magnetic shield that surrounds the outer current lead part.

5. The superconducting coil device according to claim 1, wherein the main body is formed of pure copper.

6. The superconducting coil device according to claim 1, wherein the emissivity of the heat shield layer is less than 0.1.

7. The superconducting coil device according to claim 1, wherein the heat shield layer is formed of a metal material.

8. A superconducting coil device comprising:
a vacuum vessel;
a superconducting coil located inside the vacuum vessel;
a heat shield surrounding the superconducting coil within the vacuum vessel; and
an electric current introduction line configured to introduce an electric current into the superconducting coil, the electric current introduction line comprising:
an outer current lead part that is located outside of the heat shield, within the vacuum vessel, and that is thermally coupled to the heat shield, and
an inner current lead part that is located inside of the heat shield and connects the outer current lead part to the superconducting coil,
wherein the outer current lead part comprises:
a main body serving as an electric current path to the superconducting coil,
an insulation layer that covers the main body, and
a heat shield layer that covers the insulation layer and has a lower emissivity than the insulation layer,
wherein the outer current lead part comprises:
a first end portion on a vacuum vessel side,
a second end portion on a heat shield side, and
a connecting portion connecting the first end portion and the second end portion and having a belt-like shape bendable due to a relative displacement between the first end portion and the second end portion in a thickness direction of the outer current lead part, and wherein
the outer current lead part is disposed such that thermal contraction of the outer current lead part caused by cooling of the heat shield generates a displacement of the second end portion in the thickness direction with respect to the first end portion with the connecting portion being bent in the thickness direction.

9. An electric current introduction line for introducing an electric current into a superconducting coil that is disposed in a vacuum vessel, comprising:
an outer current lead part located inside the vacuum vessel and outside a heat shield disposed to surround the superconducting coil within the vacuum vessel, and that is thermally coupled to the heat shield,
wherein the outer current lead part comprises:
a main body serving as an electric current path to the superconducting coil and formed of a metal material,
an insulation layer that covers the main body and formed of a synthetic resin material, and
a heat shield layer that covers the insulation layer and that has a lower emissivity than the insulation layer.

10. A superconducting coil device comprising:
a vacuum vessel;
a superconducting coil located inside the vacuum vessel;
a heat shield surrounding the superconducting coil within the vacuum vessel; and
an electric current introduction line configured to introduce an electric current into the superconducting coil, the electric current introduction line comprising:
an outer current lead part that is located outside of the heat shield, within the vacuum vessel, and that is thermally coupled to the heat shield, and
an inner current lead part that is located inside of the heat shield and connects the outer current lead part to the superconducting coil,
wherein the outer current lead part comprises:
a first end portion on a vacuum vessel side,
a second end portion on a heat shield side, and
a connecting portion connecting the first end portion and the second end portion and having a belt-like shape bendable due to a relative displacement between the first end portion and the second end portion in a thickness direction of the outer current lead part, and wherein
the outer current lead part is disposed such that thermal contraction of the outer current lead part caused by cooling of the heat shield generates a displacement of the second end portion in the thickness direction with respect to the first end portion with the connecting portion being bent in the thickness direction.

* * * * *